(12) United States Patent
Uchiyama et al.

(10) Patent No.: US 11,906,831 B2
(45) Date of Patent: Feb. 20, 2024

(54) ELECTRO-OPTICAL DEVICE AND ELECTRONIC APPARATUS

(71) Applicant: SEIKO EPSON CORPORATION, Tokyo (JP)

(72) Inventors: Suguru Uchiyama, Suwa (JP); Kazunari Sakamoto, Suwa (JP); Yasuhiro Takeuchi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/873,155

(22) Filed: Jul. 26, 2022

(65) Prior Publication Data

US 2023/0036785 A1 Feb. 2, 2023

(30) Foreign Application Priority Data

Jul. 27, 2021 (JP) ................. 2021-122330

(51) Int. Cl.
*G02F 1/1333* (2006.01)
*G03B 21/00* (2006.01)

(52) U.S. Cl.
CPC .... *G02F 1/13332* (2021.01); *G02F 1/133308* (2013.01); *G03B 21/006* (2013.01)

(58) Field of Classification Search
CPC .............. G02F 1/13332; G02F 1/133308
See application file for complete search history.

(56) References Cited

U.S. PATENT DOCUMENTS

| 6,141,781 | A | * | 10/2000 | Mueller | .................. H04L 1/007 |
| | | | | | 714/701 |
| 6,654,083 | B1 | * | 11/2003 | Toda | ................. G02F 1/133512 |
| | | | | | 349/110 |
| 2006/0120543 | A1 | * | 6/2006 | Kobayashi | ........... H04R 23/008 |
| | | | | | 381/152 |
| 2008/0018823 | A1 | * | 1/2008 | Wang | ................ G02F 1/133308 |
| | | | | | 349/58 |
| 2013/0242609 | A1 | * | 9/2013 | Mori | .................... G02B 6/0088 |
| | | | | | 362/611 |
| 2013/0300974 | A1 | * | 11/2013 | Yoshimoto | ........ G02F 1/133528 |
| | | | | | 445/24 |

FOREIGN PATENT DOCUMENTS

JP 2002366046 12/2002
JP 2016029431 A * 3/2016

\* cited by examiner

*Primary Examiner* — Lucy P Chien
(74) *Attorney, Agent, or Firm* — JCIPRNET

(57) ABSTRACT

An electro-optical device includes a first substrate, a second substrate bonded to the first substrate, a liquid crystal layer provided between the first substrate and the second substrate, a third substrate provided on an opposite side of the first substrate from the liquid crystal layer, and a frame configured to house the first substrate, the second substrate, and the third substrate. The frame includes a facing surface facing, via an adhesive layer, a first surface on an opposite side of the third substrate from the liquid crystal layer. The third substrate is larger than the first substrate. The frame and only the third substrate among the first substrate, the second substrate, and the third substrate are bonded to each other.

7 Claims, 12 Drawing Sheets

ELECTRO-OPTICAL DEVICE AND ELECTRONIC APPARATUS

The present application is based on, and claims priority from JP Application Serial Number 2021-122330, filed Jul. 27, 2021, the disclosure of which is hereby incorporated by reference herein in its entirety.

BACKGROUND

1. Technical Field

The present disclosure relates to an electro-optical device and an electronic apparatus.

2. Related Art

A projector including a liquid crystal panel is disclosed in JP 2002-366046 A. Accordingly, dustproof glass is bonded and fixed on both sides of a liquid crystal panel. A projection lens of a projector is set so that a liquid crystal layer is in focus on the screen. Even when dust adheres to the dustproof glass, the dust is projected on the screen as a blurred image. The dustproof glass reduces the effect of dust on the projected image.

When the liquid crystal panel is incorporated into a main body of the projector, the liquid crystal panel is installed at a frame-shaped frame in order to facilitate adjustment of a position of the liquid crystal panel. A position of the frame is adjusted when the position of the liquid crystal panel is adjusted.

In JP 2002-366046 A, a side surface of the liquid crystal panel, a bonding portion of the liquid crystal panel and the dustproof glass, and a side surface of the dustproof glass were bonded and fixed to the frame by an adhesive. The adhesive contracts when the adhesive cures. A glass plate of the liquid crystal panel bends due to the contraction of the adhesive. At this time, a thickness of a part of the liquid crystal layer increases. Since a stress applied by the adhesive decreases over time, thus the thickness of the part of the liquid crystal layer that has increased decreases. Therefore, when the state in which the thickness of the part of the liquid crystal layer increased is adjusted regarding display, the state of the liquid crystal panel is different compared to when the liquid crystal layer is adjusted over time, and there is a possibility that display quality of an electro-optical device using the liquid crystal panel is reduced. Therefore, an electro-optical device has been desired in which a possibility can be reduced that a glass plate of a liquid crystal panel bends due to contraction of an adhesive.

SUMMARY

An electro-optical device includes a first substrate, a second substrate bonded to the first substrate, a liquid crystal layer provided between the first substrate and the second substrate, a third substrate provided on an opposite side of the first substrate from the liquid crystal layer, and a frame configured to house the first substrate, the second substrate, and the third substrate, wherein the frame includes a facing surface facing, via an adhesive layer, a first surface on an opposite side of the third substrate from the liquid crystal layer, the third substrate is larger than the first substrate, and the frame and only the third substrate among the first substrate, the second substrate, and the third substrate are bonded to each other.

An electro-optical device includes a first substrate, a second substrate bonded to the first substrate, a liquid crystal layer provided between the first substrate and the second substrate, a third substrate provided on an opposite side of the first substrate from the liquid crystal layer, and a frame configured to house the first substrate, the second substrate, and the third substrate, wherein the frame includes an abutment surface abutting on a second surface of the third substrate on the liquid crystal layer side, the third substrate is larger than the first substrate, and only the third substrate and the frame are bonded to each other.

An electro-optical device includes a first substrate, a second substrate bonded to the first substrate, a liquid crystal layer provided between the first substrate and the second substrate, a third substrate provided on a third surface on an opposite side of the first substrate from the liquid crystal layer, and a frame configured to house the first substrate, the second substrate, and the third substrate, wherein the frame includes an abutment surface that abuts on the third surface, the abutment surface is located between a side surface of the third substrate and a side surface of the first substrate, the third substrate is smaller than the first substrate, and only a side surface of the first substrate and the second substrate and an inner wall of the frame are bonded to each other.

An electronic apparatus includes the electro-optical device described above.

DESCRIPTION OF EXEMPLARY EMBODIMENTS

First Exemplary Embodiment

Figure 1:
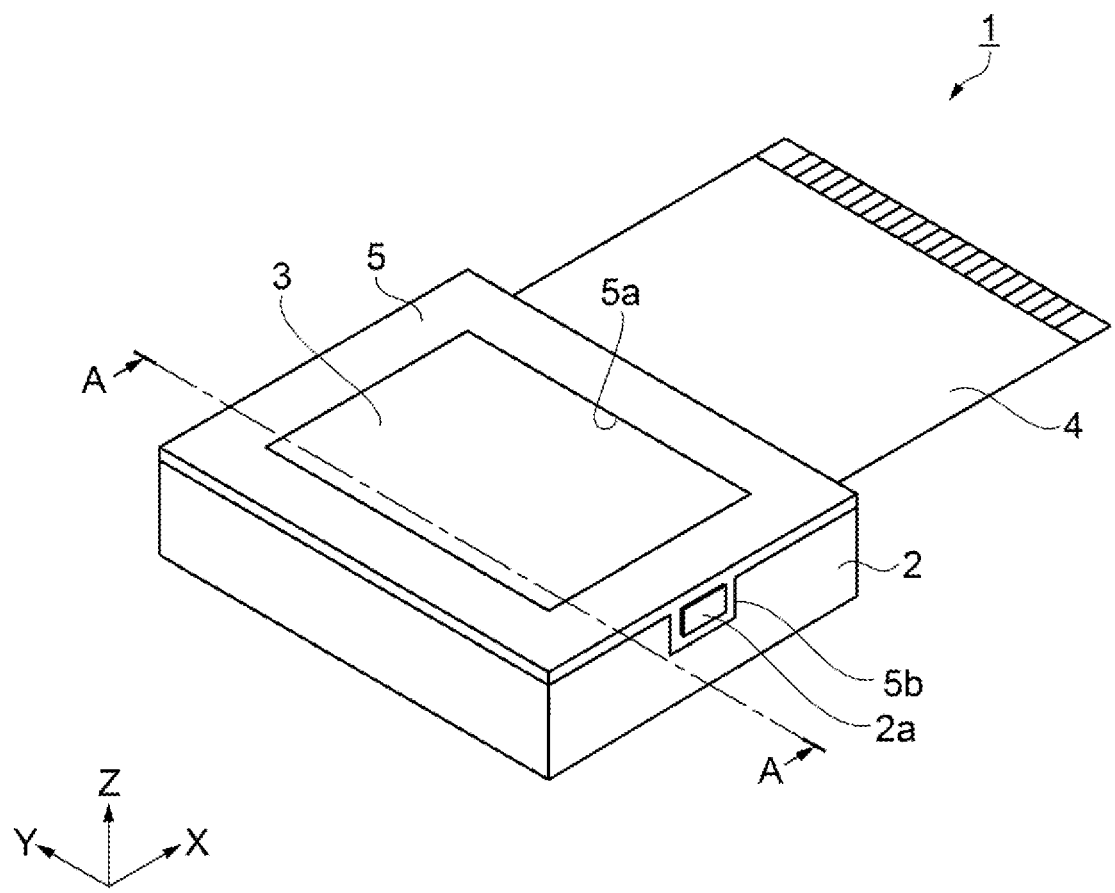
FIG. 1 is a schematic perspective view illustrating a configuration of an electro-optical device according to a first exemplary embodiment.

In the present exemplary embodiment, a characteristic example of an electro-optical device will be described with reference to the drawings. An electro-optical device according to a first exemplary embodiment will be described with reference to FIG. 1 to FIG. 3. As illustrated in FIG. 1, an electro-optical device 1 includes a rectangular frame-shaped frame 2. A thickness direction of the frame 2 is referred to as a Z direction. In a plane orthogonal to the Z direction, one of directions in which two sides of the frame 2 extends, respectively, is an X direction, and another is a Y direction. The X direction, the Y direction, and the Z direction are orthogonal to each other.

A liquid crystal panel unit 3 is housed inside the frame 2. A flexible printed wiring board 4 is electrically connected to the liquid crystal panel unit 3. The flexible printed wiring board 4 supplies various signals such as an image signal to the liquid crystal panel unit 3. A lid portion 5 is disposed on a Z positive direction side of the frame 2. The lid portion 5 includes a first opening 5a, and has a frame shape. The liquid crystal panel unit 3 is exposed from the first opening 5a.

The lid portion 5 includes a frame-shaped locking portion 5b on each of a Y positive direction side and a Y negative direction side. The frame 2 includes an insertion protruding portion 2a on each of the Y positive direction side and the Y negative direction side. The insertion protruding portion 2a is inserted into the locking portion 5b. The lid portion 5 is detachably fixed to the frame 2 by the insertion protruding portion 2a and the locking portion 5b.

Figure 2:
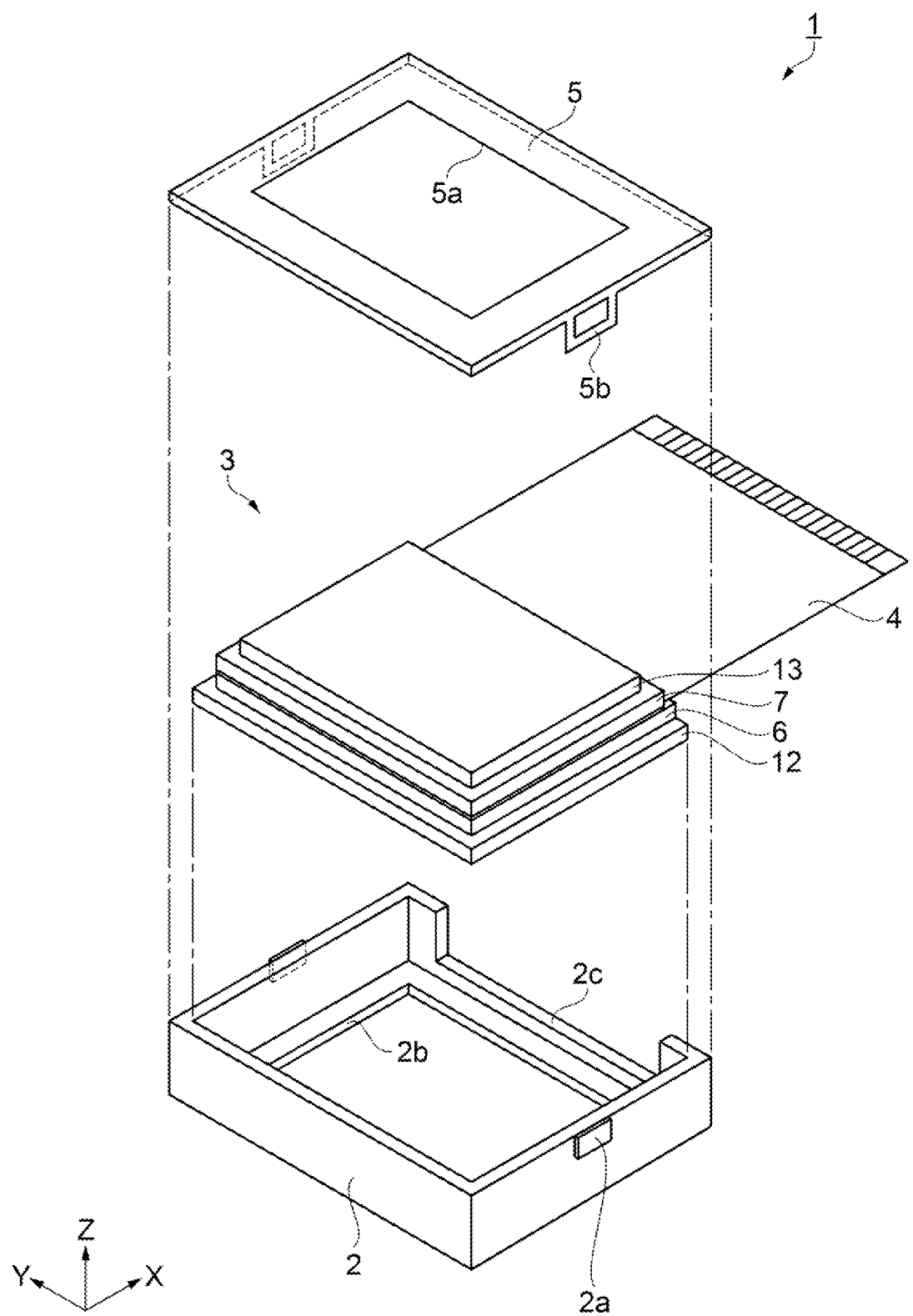
FIG. 2 is an exploded perspective view illustrating the configuration of the electro-optical device.

As illustrated in FIG. 2, the frame 2 includes a second opening 2b. The liquid crystal panel unit 3 is exposed from the second opening 2b. The frame 2 includes a notch portion 2c in a side surface on an X positive direction side. The flexible printed wiring board 4 is disposed at the notch portion 2c.

Figure 3:
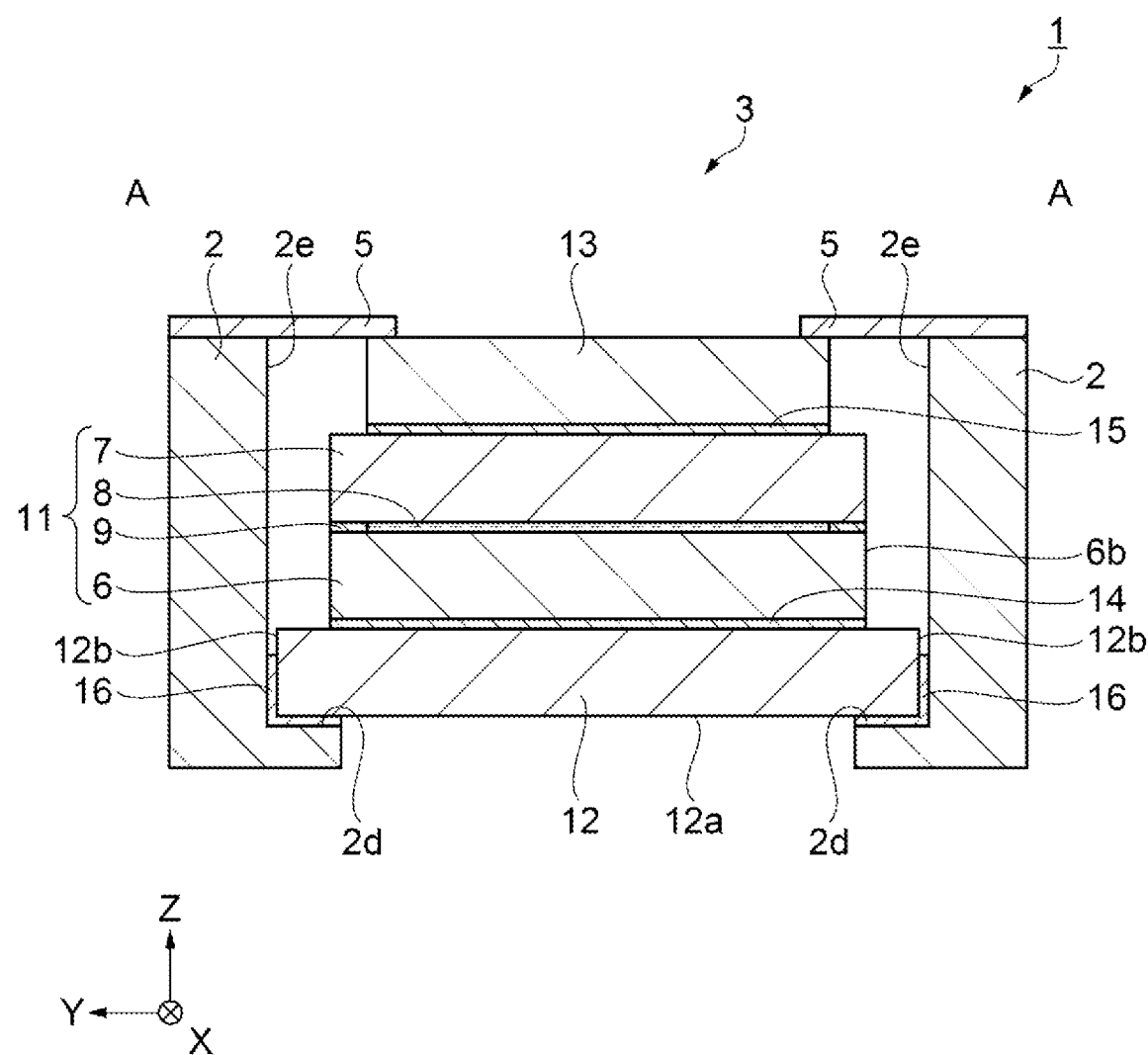
FIG. 3 is a schematic side cross-sectional view illustrating the configuration of the electro-optical device.

FIG. 3 is a cross-sectional view viewed from a line AA side of FIG. 1. As illustrated in FIG. 3, the liquid crystal panel unit 3 of the electro-optical device 1 includes a first substrate 6, a second substrate 7, and a liquid crystal layer 8. The second substrate 7 is bonded to the first substrate 6 by a sealing member 9. The liquid crystal layer 8 is provided between the first substrate 6 and the second substrate 7. The liquid crystal layer 8 is sealed by the sealing member 9. A liquid crystal panel 11 is configured by the first substrate 6, the second substrate 7, the liquid crystal layer 8, the sealing member 9, and the like.

The first substrate 6 and the second substrate 7 each include a transparent electrode at a surface on the liquid crystal layer 8 side. When a voltage is applied between the transparent electrodes, an array of the liquid crystal molecules changes in the liquid crystal layer 8. Thus, polarization of light passing through the liquid crystal layer 8 is twisted. When light is viewed through a polarization filter, a proportion of light passing through the polarization filter is changed depending on a degree of the twist of light.

The liquid crystal panel unit 3 includes a third substrate 12 and a fourth substrate 13 in addition to the liquid crystal panel 11. The third substrate 12 and the fourth substrate 13 are referred to as protective members or dustproof members. The third substrate 12 and the fourth substrate 13 prevent dust from adhering to the first substrate 6 and the second substrate 7. The first substrate 6, the second substrate 7, the third substrate 12, and the fourth substrate 13 are housed in the frame 2.

The third substrate 12 is provided on an opposite side of the first substrate 6 from the liquid crystal layer 8. The third substrate 12 is larger than the first substrate 6. The third substrate 12 is bonded to the first substrate 6 by a first adhesive 14.

The fourth substrate 13 is provided on an opposite side of the second substrate 7 from the liquid crystal layer 8. The fourth substrate 13 is bonded to the second substrate 7 by a second adhesive 15.

The third substrate 12 includes a first surface 12a on a side opposite to the liquid crystal layer 8. The frame 2 includes a facing surface 2d facing the first surface 12a. The first surface 12a of the third substrate 12 and the facing surface 2d of the frame 2 are bonded by an adhesive layer 16. In other words, the frame 2 includes the facing surface 2d facing the first surface 12a of the third substrate 12 via the adhesive layer 16.

A side surface 12b of the third substrate 12 and an inner wall 2e of the frame 2 are bonded to each other. The frame 2 and only the third substrate 12 among the first substrate 6, the second substrate 7, and the third substrate 12 are bonded to each other.

According to this configuration, the frame 2 and the third substrate 12 are bonded and fixed by the adhesive layer 16. A part of the third substrate 12 protruding from the first substrate 6 and the first substrate 6 are not joined by the adhesive layer 16 for fixing to the frame 2, so that the first substrate 6 and the third substrate 12 can be prevented from being bent by the adhesive layer 16 for fixing to the frame 2. By disposing the third substrate 12 in a gravitational direction compared to the first substrate 6 to join the frame 2 and the third substrate 12, it is possible to prevent the adhesive layer 16 for fixing to the frame 2 from flowing from the side surface 12b of the third substrate 12 to the side surface 6b of the first substrate 6. Accordingly, in the electro-optical device 1, a possibility can be reduced that the first substrate 6 and the second substrate 7 of the liquid crystal panel 11 are bent due to contraction of the adhesive layer 16 for fixing to the frame 2. As a result, a possibility can be reduced that a thickness of a part of the liquid crystal layer 8 is changed, and display quality of the electro-optical device 1 using the liquid crystal panel 11 deteriorates.

A direction in which light is incident on the electro-optical device 1 is not particularly limited, but in the present exemplary embodiment, for example, light is incident from the fourth substrate 13 and emitted from the third substrate 12. At this time, for example, sapphire glass is used for a material of the fourth substrate 13. Neoceram (registered trademark) is used for a material of the third substrate 12. For example, a quartz substrate including silicon oxide is used for a material of the first substrate 6. For example, a quartz substrate is used for a material of the second substrate 7. The first substrate 6 is an element substrate at which a plurality of thin film transistors are disposed. The second substrate 7 is a counter substrate. Note that, the first substrate 6 may be used as a counter substrate, and the second substrate 7 may be used as an element substrate.

Note that, a configuration may be adopted in which the incident direction is reversed, where light is incident from the third substrate 12 and emitted from the fourth substrate 13. At least one of the first substrate 6 and the second substrate 7 may be a glass substrate. Quartz may be used for the respective materials of both the third substrate 12 and the fourth substrate 13. In addition, a material made of each of sapphire glass, Neoceram, quartz, and the like may be used for the material of the third substrate 12 and the fourth substrate 13.

A material of the lid portion 5 may be a metal having springiness. In the present exemplary embodiment, for example, the material of the lid portion 5 is stainless steel. Resin is suitably used for a material of the frame 2. By using resin, a complicated shape of the frame 2 can be formed. In addition, metal may be used for the material of the frame 2.

An assembly procedure of the electro-optical device 1 is as follows. First, the frame 2 is disposed at a base of a dedicated jig. In the frame 2, an adhesive to be a material of the adhesive layer 16 is applied to a location facing the first surface 12a and the side surface 12b of the third substrate 12. In the present exemplary embodiment, for example, a silicone adhesive is used as the adhesive material to be the adhesive layer 16. A syringe is used for application of the adhesive. A movement trajectory of the syringe is controlled by a numerically controlled XY table or the like. Next, the liquid crystal panel unit 3 is installed inside the frame 2. A lid of the dedicated jig is set, and the frame 2 and the liquid crystal panel unit 3 are fixed. The adhesive is left for about two hours to be dried. Further, the adhesive is heated and dried at about 70 degrees for about 15 minutes to cure the adhesive. The liquid crystal panel unit 3 and the frame 2 are removed from the dedicated jig. The lid portion 5 is installed at the frame 2. This completes the electro-optical device 1. Note that, the adhesive may be applied to the third substrate 12, rather than the frame 2.

COMPARATIVE EXAMPLE

Figure 13:
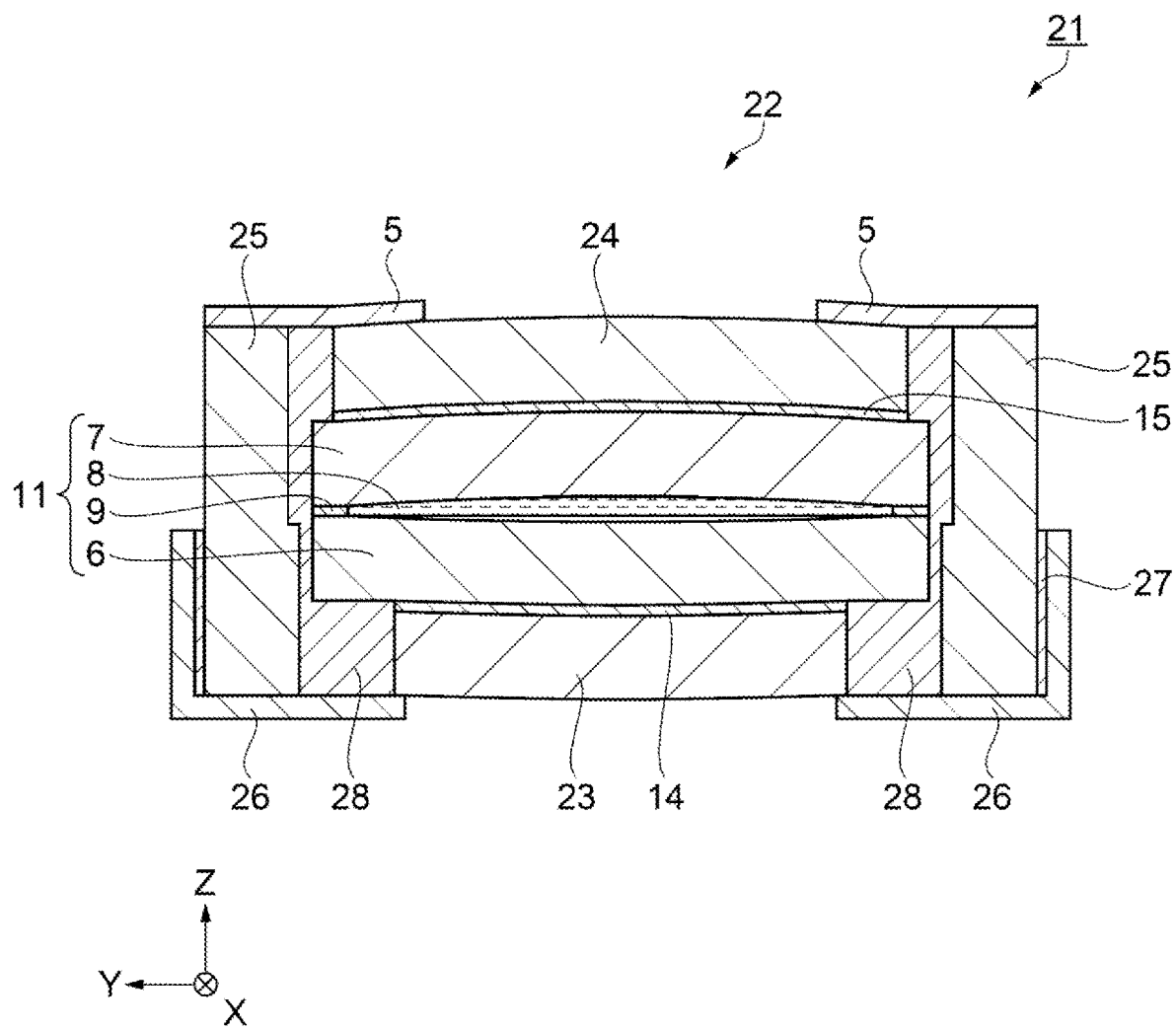
FIG. 13 is a schematic side cross-sectional side view illustrating a configuration of an electro-optical device according to a comparative example.

An electro-optical device 21 of a comparative example illustrated in FIG. 13 includes a liquid crystal panel unit 22. The liquid crystal panel unit 22 includes the same liquid crystal panel 11 as in the first exemplary embodiment.

The liquid crystal panel unit 22 includes a third substrate 23 and a fourth substrate 24 in addition to the liquid crystal panel 11. The first substrate 6, the second substrate 7, the third substrate 23, and the fourth substrate 24 are housed in a frame 25.

The third substrate 23 is provided on an opposite side of the first substrate 6 from the liquid crystal layer 8. The third substrate 23 is bonded to the first substrate 6 by the first adhesive 14.

The fourth substrate 24 is provided on an opposite side of the second substrate 7 from the liquid crystal layer 8. The fourth substrate 24 is bonded to the second substrate 7 by the second adhesive 15.

The lid portion 5 is provided on the Z positive direction side of the frame 25. A light blocking frame 26 is provided on a Z negative direction side of the frame 25. The light blocking frame 26 suppresses light from shining on an outer periphery of the liquid crystal panel 11. The light blocking frame 26 suppresses stray light from entering inside the liquid crystal panel 11. The light blocking frame 26 is bonded to the frame 25 by a third adhesive 27.

The first substrate 6, the second substrate 7, the third substrate 23, and the fourth substrate 24 are bonded to the frame 25 by a fourth adhesive 28. When the fourth adhesive 28 cures, the fourth adhesive 28 contracts. At this time, a stress protruding toward the Z negative direction side acts on the third substrate 23, by the fourth adhesive 28. The first substrate 6 is pulled by the third substrate 23 and protrudes toward the Z negative direction side.

A stress protruding toward the Z positive direction side acts on the fourth substrate 24, by the fourth adhesive 28. The second substrate 7 is pulled by the fourth substrate 24 and protrudes toward the Z positive direction side. In the liquid crystal layer 8, a thickness of a central part is larger than a thickness of a peripheral part. At this time, the liquid crystal panel 11 may be colored. In addition, a creep phenomenon causes a change with time, and decreases the contraction of the fourth adhesive 28. At this time, a tint of the liquid crystal panel 11 changes. In the liquid crystal panel 11 of the first exemplary embodiment, since the change in the thickness of the liquid crystal layer 8 is suppressed, the liquid crystal panel 11 is prevented from being colored.

Second Exemplary Embodiment

The present exemplary embodiment differs from the first exemplary embodiment in the shape of the frame 2 illustrated in FIG. 3. Note that, the configurations identical to those in the first exemplary embodiment will be denoted by the same reference signs and redundant descriptions will be omitted.

Figure 4:
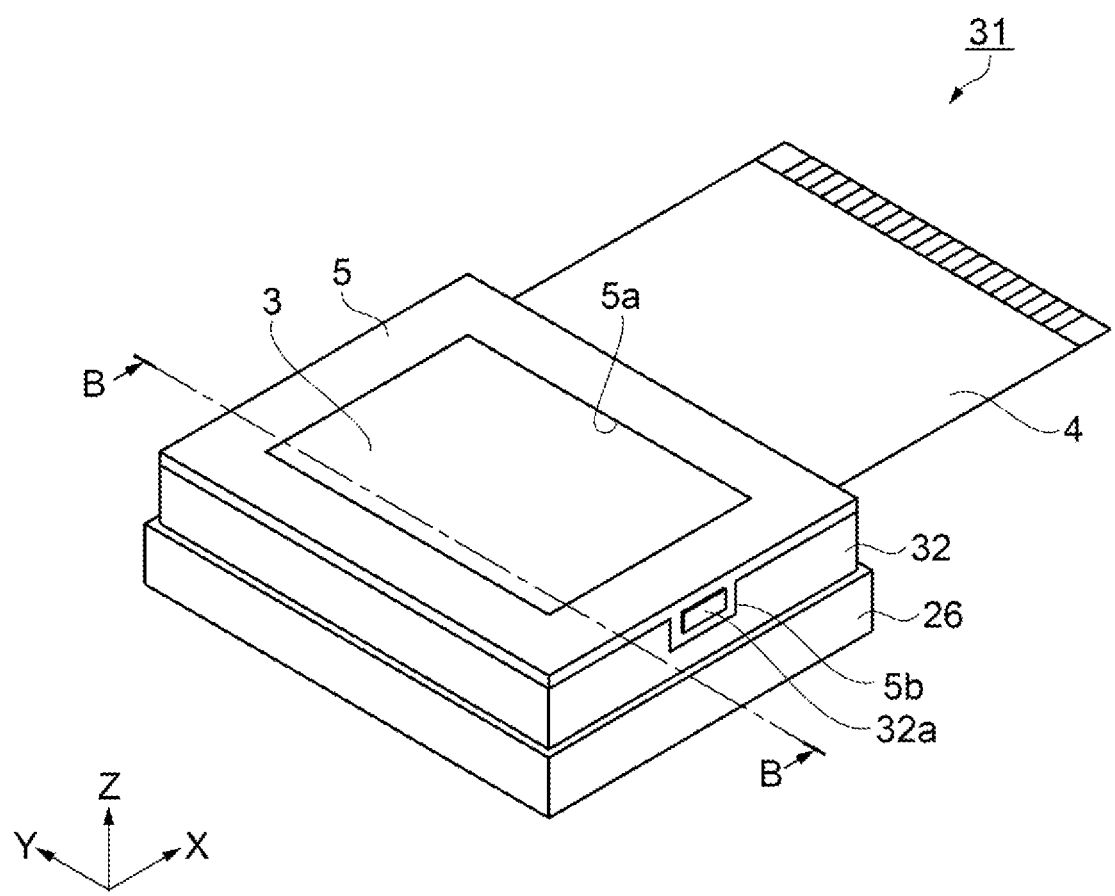
FIG. 4 is a schematic perspective view illustrating a configuration of an electro-optical device according to a second exemplary embodiment.

As illustrated in FIG. 4, an electro-optical device 31 includes a rectangular frame-shaped frame 32. The liquid crystal panel unit 3 is housed inside the frame 32. A flexible printed wiring board 4 is electrically connected to the liquid crystal panel unit 3. The flexible printed wiring board 4 supplies various signals such as an image signal to the liquid crystal panel unit 3. The lid portion 5 is disposed on the Z positive direction side of the frame 32. The lid portion 5 includes a first opening 5a, and has a frame shape. The liquid crystal panel unit 3 is exposed from the first opening 5a.

The lid portion 5 includes a frame-shaped locking portion 5b on each of a Y positive direction side and a Y negative direction side. The frame 32 includes an insertion protruding portion 32a on each of the Y positive direction side and the Y negative direction side. The insertion protruding portion 32a is inserted into the locking portion 5b. The lid portion 5 is detachably fixed to the frame 32 by the insertion protruding portion 32a and the locking portion 5b. The light blocking frame 26 is provided on the Z negative direction side of the frame 32. A thickness in the Z direction of the light blocking frame 26 is smaller than that of the frame 2 of the first exemplary embodiment. As a result, the third substrate 12 is likely to be hit by air flowing from the X direction and the Y direction. Accordingly, the liquid crystal panel unit 3 is easily air-cooled.

Figure 5:
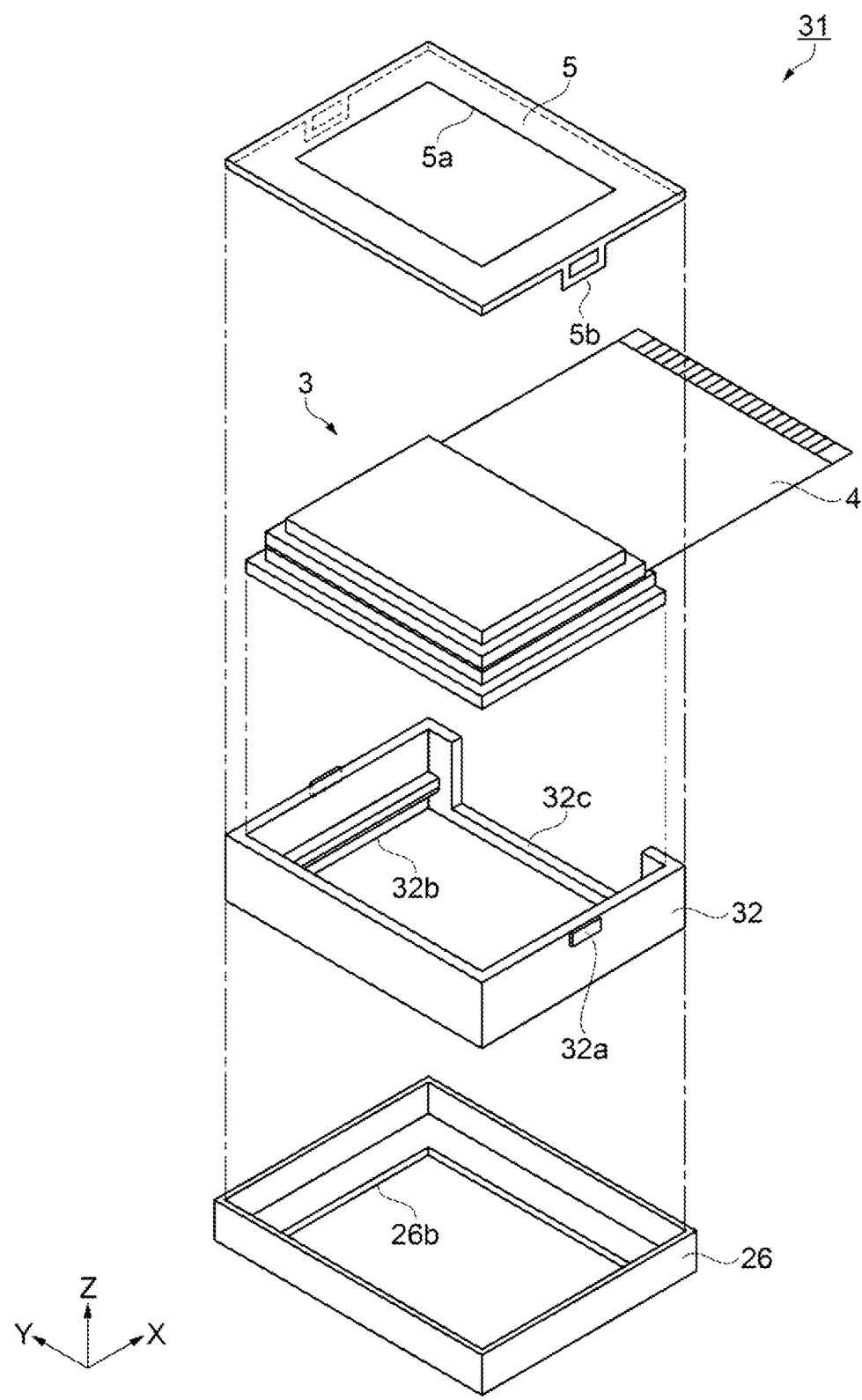
FIG. 5 is an exploded perspective view illustrating the configuration of the electro-optical device.

As illustrated in FIG. 5, the frame 32 includes a second opening 32b. The light blocking frame 26 includes a third opening 26b. The liquid crystal panel unit 3 is exposed from the second opening 32b and the third opening 26b. The frame 32 includes a notch portion 32c on a side surface on the X positive direction side. The flexible printed wiring board 4 is disposed at the notch portion 32c.

Figure 6:
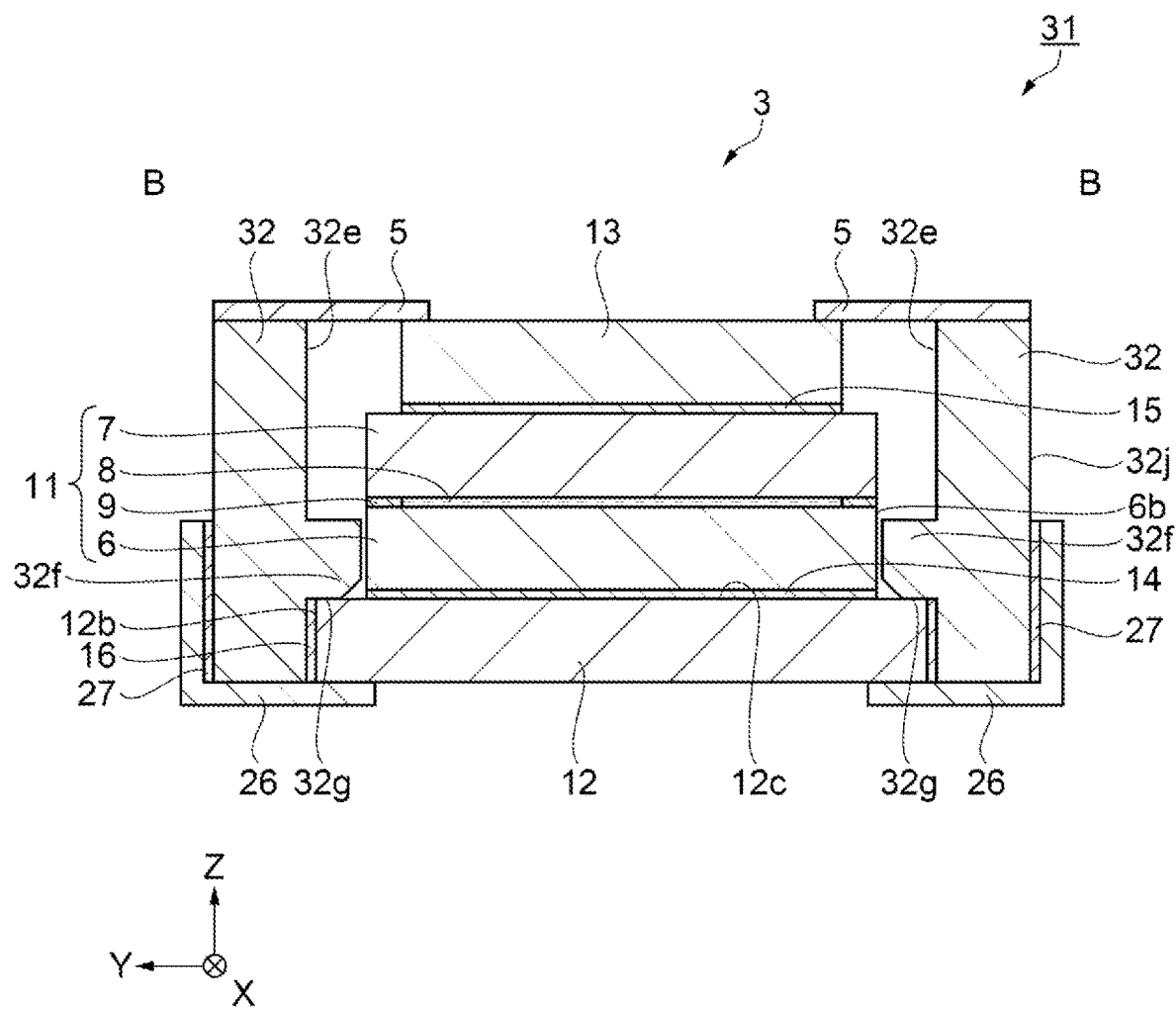
FIG. 6 is a schematic side cross-sectional view illustrating the configuration of the electro-optical device.

FIG. 6 is a cross-sectional view viewed from a line BB side of FIG. 4. As illustrated in FIG. 6, the liquid crystal panel unit 3 of the electro-optical device 31 includes the liquid crystal panel 11. The second substrate 7 is bonded to the first substrate 6 by a sealing member 9. The liquid crystal layer 8 is provided between the first substrate 6 and the second substrate 7. The liquid crystal layer 8 is sealed by the sealing member 9. A liquid crystal panel 11 is configured by the first substrate 6, the second substrate 7, the liquid crystal layer 8, the sealing member 9, and the like.

The liquid crystal panel unit 3 includes a third substrate 12 and a fourth substrate 13 in addition to the liquid crystal panel 11. The first substrate 6, the second substrate 7, the third substrate 12, and the fourth substrate 13 are housed in the frame 32.

The third substrate 12 is provided on an opposite side of the first substrate 6 from the liquid crystal layer 8. The third substrate 12 is larger than the first substrate 6. The third substrate 12 is bonded to the first substrate 6 by a first adhesive 14.

The third substrate 12 includes a second surface 12c on the liquid crystal layer 8 side. The frame 32 includes a protruding portion 32f that protrudes from an inner wall 32e of the frame 32 toward the first substrate 6. The protruding portion 32f has an abutment surface 32g that abuts on the second surface 12c on the liquid crystal layer 8 side of the third substrate 12. Accordingly, the frame 32 has the abutment surface 32g that abuts on the second surface 12c on the liquid crystal layer 8 side of the third substrate 12.

Only the side surface 12b of the third substrate 12 and the inner wall 32e of the frame 32 are bonded to each other. The frame 32 and only the third substrate 12 among the first substrate 6, the second substrate 7, and the third substrate 12 are bonded to each other.

According to this configuration, the frame 32 and the third substrate 12 are bonded and fixed by the adhesive layer 16. A part of the third substrate 12 protruding from the first substrate 6 and the first substrate 6 are not joined by the adhesive layer 16 for fixing to the frame 32, so that the first substrate 6 and the third substrate 12 can be prevented from being bent by the adhesive layer 16 for fixing to the frame 32. The abutment surface 32g is disposed between the side surface 12b of the third substrate 12 and the side surface 6b of the first substrate 6. Since the frame 32 and the third substrate 12 abut on each other at the abutment surface 32g, the adhesive layer 16 for fixing to the frame 32 can be prevented from flowing from the side surface 12b of the third substrate 12 to the side surface 6b of the first substrate 6. Accordingly, in the electro-optical device 31, a possibility can be reduced that the first substrate 6 and the second substrate 7 of the liquid crystal panel 11 are bent due to contraction of the adhesive layer 16 for fixing to the frame 32. As a result, a possibility can be reduced that a thickness of a part of the liquid crystal layer 8 is changed, and display quality of the electro-optical device 31 using the liquid crystal panel 11 deteriorates.

The light blocking frame 26 is provided on the Z negative direction side of the frame 32. The light blocking frame 26 suppresses light from shining on an outer periphery of the liquid crystal panel 11. The light blocking frame 26 suppresses stray light from entering inside the liquid crystal panel 11. The light blocking frame 26 is bonded to the frame 32.

A metal that can be easily drawn may be used as a material of the light blocking frame 26, and in the present exemplary embodiment, for example, stainless steel is used as the material of the light blocking frame 26.

A procedure for assembling the electro-optical device 31 is as follows. First, in the frame 32, an adhesive to be a material of the adhesive layer 16 is applied to a location facing the side surface 12b of the third substrate 12. Next, the liquid crystal panel unit 3 is installed inside the frame 32. The third adhesive 27 is applied to an outer wall 32j of the frame 32 or to inner side of the light blocking frame 26. Next, the light blocking frame 26 is pushed into the frame 32 for assembling. The liquid crystal panel unit 3, the frame 32, and the light blocking frame 26 are heated and dried to cure the adhesive becoming the material of the adhesive layer 16, and the third adhesive 27. Next, the lid portion 5 is installed at the frame 32. This completes the electro-optical device 31.

Third Exemplary Embodiment

The present exemplary embodiment differs from the first exemplary embodiment in that a substrate corresponding to the third substrate 12 is smaller than the first substrate 6. Note that, the configurations identical to those in the first exemplary embodiment will be denoted by the same reference signs and redundant descriptions will be omitted.

Figure 7:
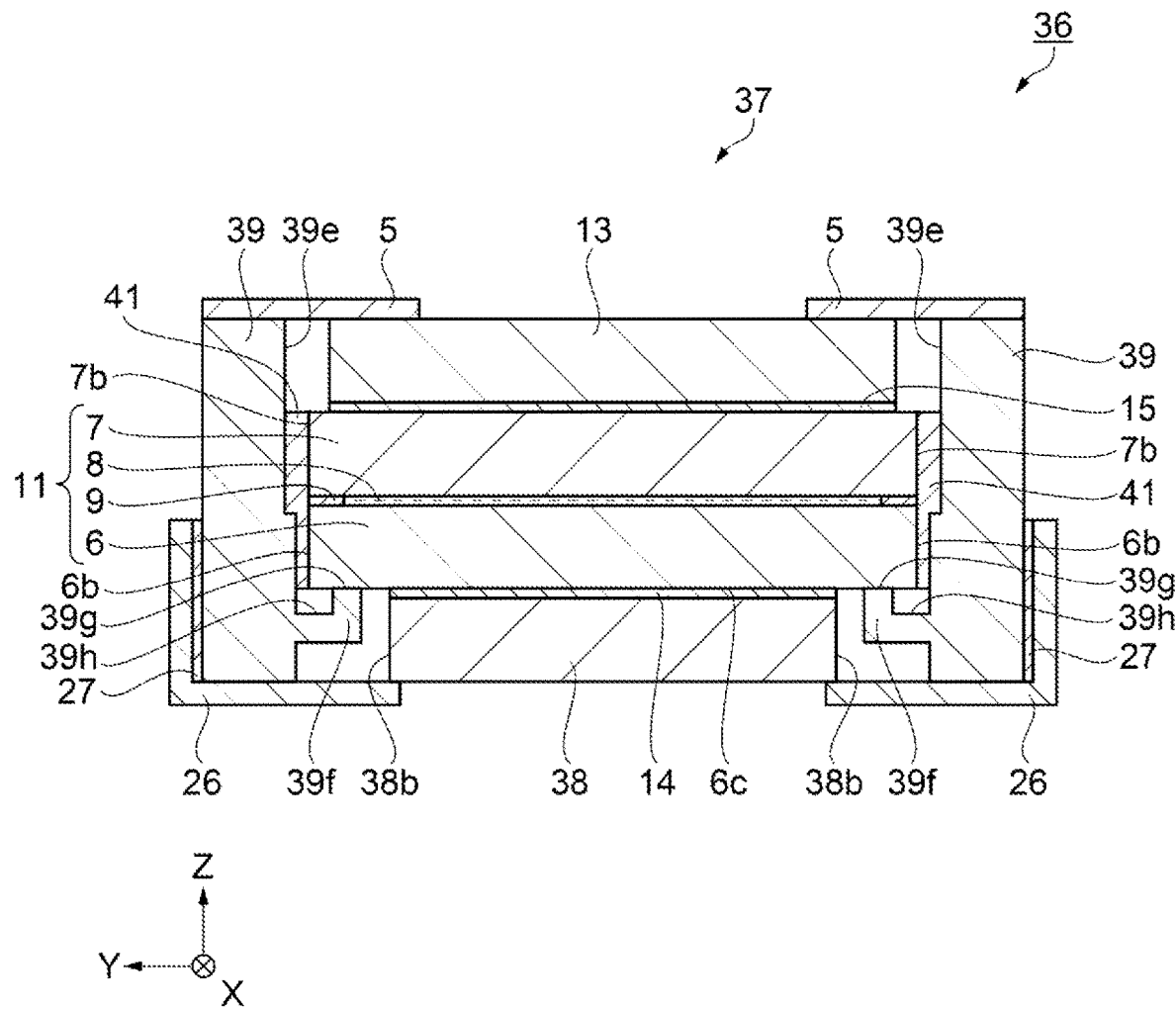
FIG. 7 is a schematic side cross-sectional view illustrating a configuration of an electro-optical device according to a third exemplary embodiment.

As illustrated in FIG. 7, a liquid crystal panel unit 37 of an electro-optical device 36 includes the liquid crystal panel 11. The configuration of the liquid crystal panel 11 is the same as that in the first exemplary embodiment.

The liquid crystal panel unit 37 includes a third substrate 38 and the fourth substrate 13 in addition to the liquid crystal panel 11. The first substrate 6, the second substrate 7, the third substrate 38, and the fourth substrate 13 are housed in a frame 39.

The third substrate 38 is provided at a third surface 6c on an opposite side of the first substrate 6 from the liquid crystal layer 8. The third substrate 38 is smaller than the first substrate 6. The third substrate 38 is bonded to the first substrate 6 by the first adhesive 14.

The frame 39 includes a protruding portion 39f that protrudes from an inner wall 39e of the frame 39 toward the third substrate 38. The protruding portion 39f has an abutment surface 39g that abuts on the third surface 6c of the first substrate 6. Accordingly, the frame 39 has the abutment surface 39g that abuts on the third surface 6c of the first substrate 6. The abutment surface 39g is located between a side surface 38b of the third substrate 38 and the side surface 6b of the first substrate 6.

Only the side surface 6b of the first substrate 6 and a side surface 7b of the second substrate 7 and the inner wall 39e of the frame 39 are bonded to each other by a fifth adhesive 41 as an adhesive.

According to this configuration, the frame 39 and the first substrate 6 and the second substrate 7 are bonded and fixed. Since the side surface 38b of the third substrate 38 smaller than the first substrate 6 and the first substrate 6 are not joined by the fifth adhesive 41, the first substrate 6 and the third substrate 38 can be prevented from being bent by the fifth adhesive 41. The abutment surface 39g is disposed between the side surface 38b of the third substrate 38 and the side surface 6b of the first substrate 6. Since the frame 39 and the first substrate 6 abut on each other at the abutment surface 39g, the fifth adhesive 41 for fixing the frame 39 and the first substrate 6 can be prevented from flowing from the side surface 6b of the first substrate 6 to the third substrate 38. Accordingly, in the electro-optical device 36, a possibility can be reduced that the first substrate 6 and the second substrate 7 of the liquid crystal panel 11 are bent due to contraction of the fifth adhesive 41 for fixing the frame 39 and the first substrate 6 and the second substrate 7. As a result, a possibility can be reduced that a thickness of a part of the liquid crystal layer 8 is changed, and display quality of the electro-optical device 36 using the liquid crystal panel 11 deteriorates.

According to this configuration, since the protruding portion 39f protrudes toward the third substrate 38, the abutment surface 39g can be disposed between the side surface 6b of the first substrate 6 and the side surface 38b of the third substrate 38.

The protruding portion 39f has a recessed portion 39h between the abutment surface 39g and the inner wall 39e of the frame 39. According to this configuration, even when the fifth adhesive 41 drips from between the first substrate 6 and the second substrate 7 and the inner wall 39e of the frame 39, the fifth adhesive 41 can be received by the recessed portion 39h, and thus the fifth adhesive 41 can be prevented from adhering to both the third surface 6c of the first substrate 6 and the side surface 38b of the third substrate 38.

The light blocking frame 26 is provided on the Z negative direction side of the frame 39. The light blocking frame 26 suppresses light from shining on an outer periphery of the liquid crystal panel 11. The light blocking frame 26 suppresses stray light from entering inside the liquid crystal panel 11. The light blocking frame 26 is bonded to the frame 39 by the third adhesive 27.

Fourth Exemplary Embodiment

The present exemplary embodiment differs from the third exemplary embodiment in the shape of the protruding portion 39f of the frame 39. Note that, the configurations identical to those in the third exemplary embodiment will be denoted by the same reference signs and redundant descriptions will be omitted.

Figure 8:
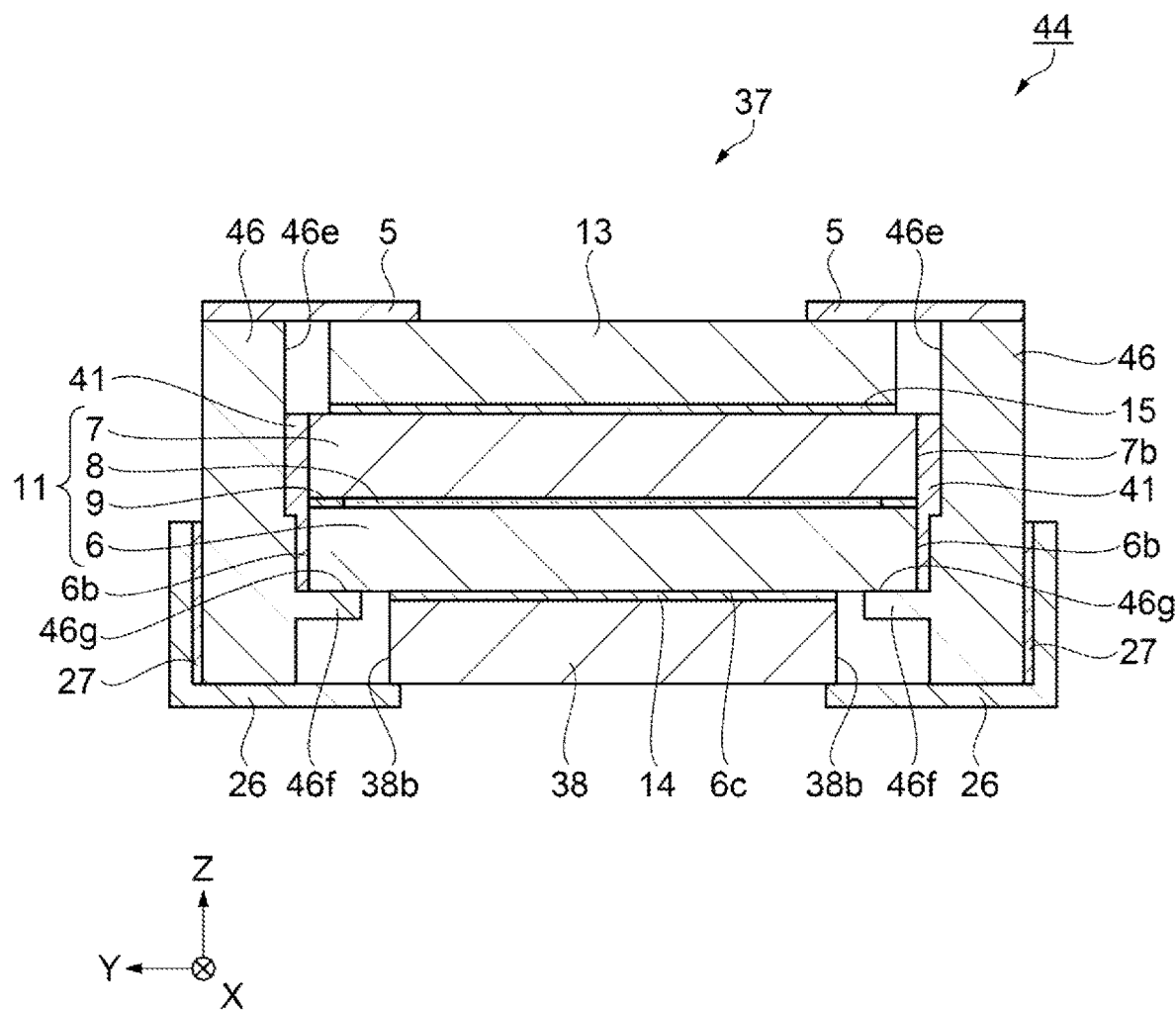
FIG. 8 is a schematic side cross-sectional view illustrating a configuration of an electro-optical device according to a fourth exemplary embodiment.

As illustrated in FIG. 8, an electro-optical device 44 includes the liquid crystal panel unit 37. The structure of the liquid crystal panel unit 37 is the same as that of the third exemplary embodiment.

The first substrate 6, the second substrate 7, the third substrate 38, and the fourth substrate 13 are housed in a frame 46. The frame 46 includes a protruding portion 46f that protrudes from an inner wall 46e of the frame 46 toward the third substrate 38. The protruding portion 46f has an abutment surface 46g that abuts on the third surface 6c of the first substrate 6. Accordingly, the frame 46 has the abutment surface 46g that abuts on the third surface 6c of the first substrate 6. The abutment surface 46g is located between a side surface 38b of the third substrate 38 and the side surface 6b of the first substrate 6.

Only the side surface 6b of the first substrate 6 and the side surface 7b of the second substrate 7 and the inner wall 46e of the frame 46 are bonded to each other by the fifth adhesive 41.

According to this configuration, the abutment surface 46g is disposed between the side surface 38b of the third substrate 38 and the side surface 6b of the first substrate 6. Since the frame 46 and the first substrate 6 abut on each other at the abutment surface 46g, the fifth adhesive 41 for fixing the frame 46 and the first substrate 6 can be prevented from flowing from the side surface 6b of the first substrate 6 to the third substrate 38. Accordingly, in the electro-optical device 44, a possibility can be reduced that the first substrate 6 and the second substrate 7 of the liquid crystal panel 11 are bent due to contraction of the fifth adhesive 41 for fixing the frame 46 and the first substrate 6 and the second substrate 7. As a result, a possibility can be reduced that a thickness of a part of the liquid crystal layer 8 is changed, and display quality of the electro-optical device 44 using the liquid crystal panel 11 deteriorates.

According to this configuration, since the protruding portion 46f protrudes toward the third substrate 38, the abutment surface 46g can be disposed between the side surface 6b of the first substrate 6 and the side surface 38b of the third substrate 38.

Fifth Exemplary Embodiment

The present exemplary embodiment differs from the third exemplary embodiment in that a through-hole is included for injecting the fifth adhesive 41 into a side surface of a component corresponding to the frame 39. Note that, the configurations identical to those in the third exemplary embodiment will be denoted by the same reference signs and redundant descriptions will be omitted.

Figure 9:
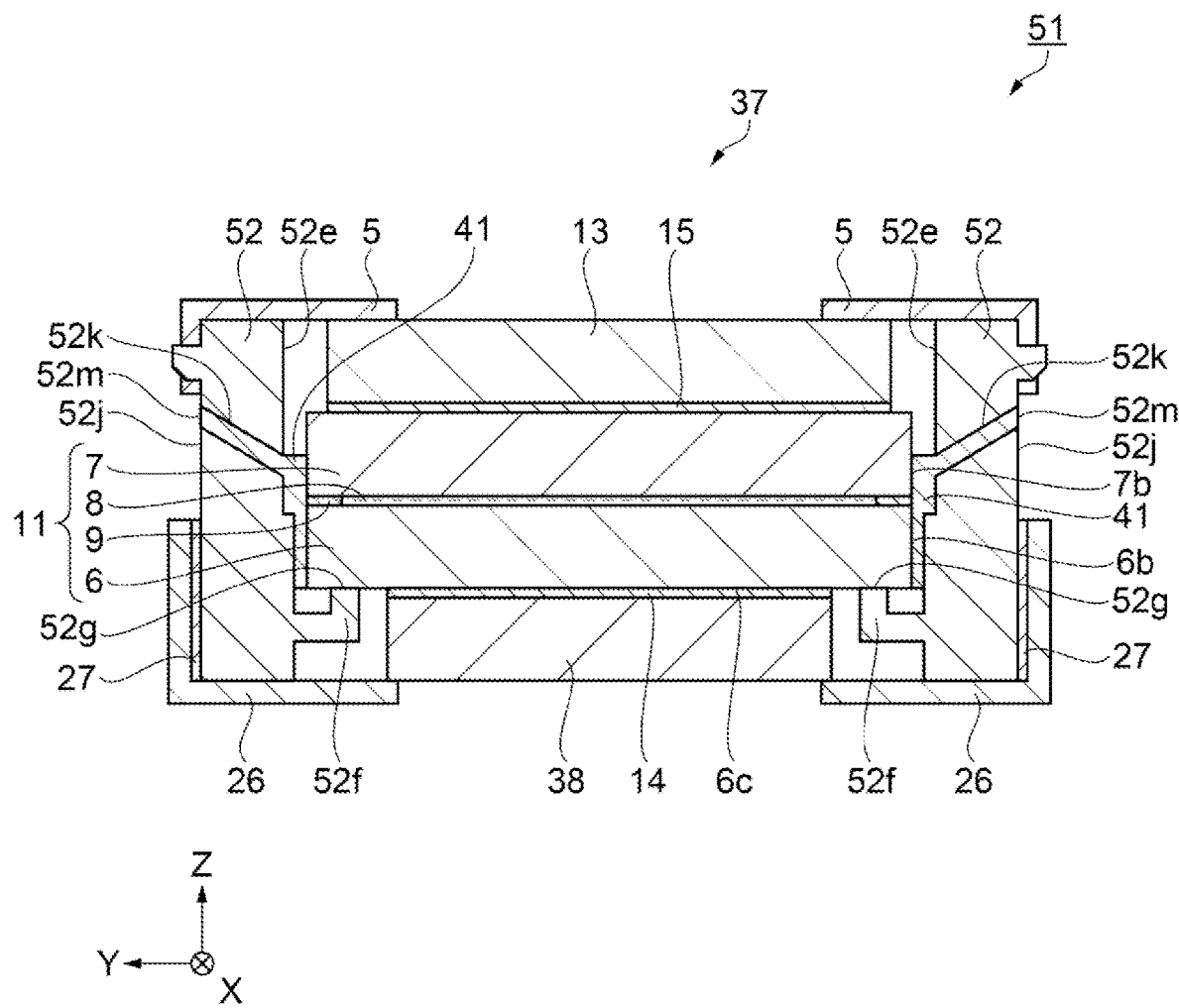
FIG. 9 is a schematic side cross-sectional view illustrating a configuration of an electro-optical device according to a fifth exemplary embodiment.

As illustrated in FIG. 9, an electro-optical device 51 includes the liquid crystal panel unit 37 and a frame 52. The liquid crystal panel unit 37 is housed in the frame 52. The liquid crystal panel unit 37 and the frame 52 are bonded by the fifth adhesive 41.

Figure 10:
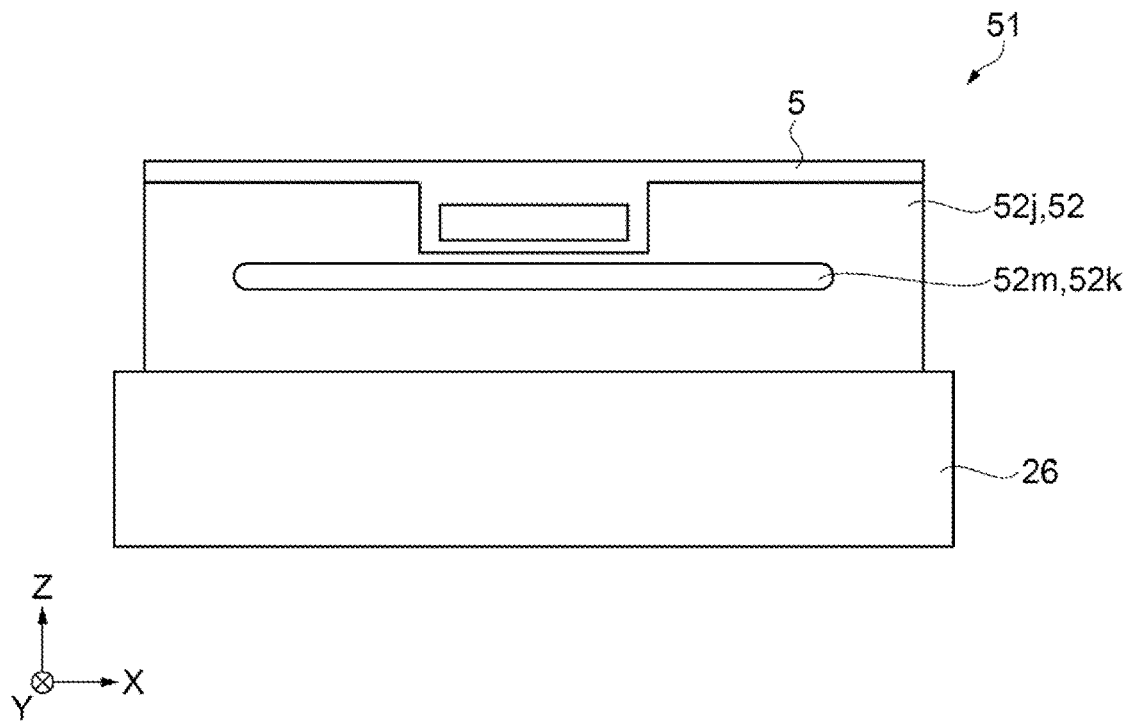
FIG. 10 is a schematic side view illustrating the configuration of the electro-optical device.

As illustrated in FIG. 9 and FIG. 10, the frame 52 includes a through-hole 52k that penetrates from an outer wall 52j to an inner wall 52e. The outer wall 52j side of the through-hole 52k is an injection port 52m. The frame 52 has the injection port 52m for injecting the fifth adhesive 41. The injection port 52m is provided at the outer wall 52j on each of the X negative direction side, the Y positive direction side, and the Y negative direction side. One injection port 52m is provided at the outer wall 52j in each of the three directions. The injection port 52m may be set to be long within a range where strength of the frame 52 is maintained. The fifth adhesive 41 can be injected into a wide range.

The frame 52 includes a protruding portion 52f that protrudes from the inner wall 52e of the frame 52 toward the third substrate 38. The protruding portion 52f has an abutment surface 52g that abuts on the third surface 6c of the first substrate 6. The injection port 52m is provided closer to the second substrate 7 side than the abutment surface 52g. The gel-like fifth adhesive 41 before being cured may be injected from the injection port 52m. At this time, the gel-like fifth adhesive 41 is filled through the side surface 7b of the second substrate 7 up to the side surface 6b of the first substrate 6.

According to this configuration, the fifth adhesive 41 can be disposed between the first substrate 6 and the second substrate 7 and the frame 52, after the first substrate 6 and the second substrate 7 are disposed inside the frame 52. In addition, the first substrate 6 and the second substrate 7 can be disposed inside the frame 52, after the fifth adhesive 41 is applied to the side surface 6b of the first substrate 6 and the side surface 7b of the second substrate 7. Accordingly, a step that is performed first can be selected, from the step of applying the fifth adhesive 41 and the step of disposing the first substrate 6 and the second substrate 7 inside the frame 52.

Sixth Exemplary Embodiment

The present exemplary embodiment differs from the fifth exemplary embodiment in that a plurality of through-holes are included for injecting the fifth adhesive 41 into a side surface of the frame 39. Note that, the configurations identical to those in the fifth exemplary embodiment will be denoted by the same reference signs and redundant descriptions will be omitted.

Figure 11:
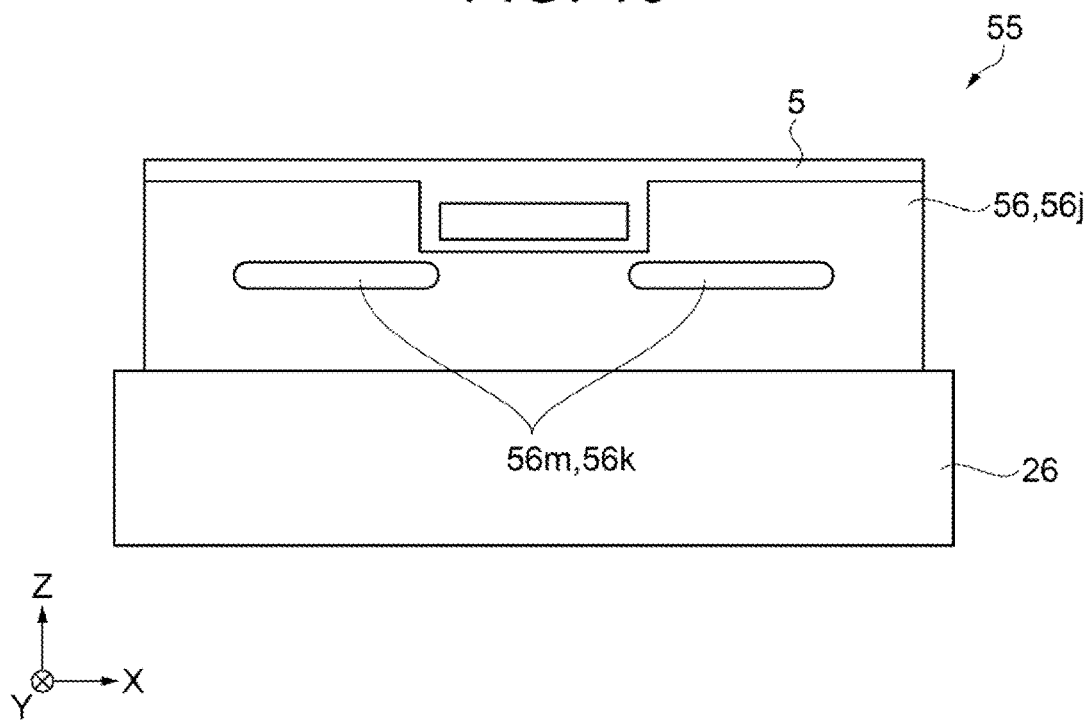
FIG. 11 is a schematic side view illustrating a configuration of an electro-optical device according to a sixth exemplary embodiment.

As illustrated in FIG. 11, an electro-optical device 55 includes a frame 56. The liquid crystal panel unit 37 is housed in the frame 56.

The frame 56 includes a through-hole 56k that penetrates from an outer wall 56j to an inner wall. The outer wall 56j side of the through-hole 56k is an injection port 56m. The gel-like fifth adhesive 41 may be injected from the injection port 56m. The injection port 56m is provided at the outer wall 56j on each of the X negative direction side, the Y positive direction side, and the Y negative direction side. Two or more injection ports 56m are provided at the outer wall 56j in each of the three directions. The injection port 56*m* may be set to be long within a range where strength of the frame 56 is maintained. The fifth adhesive 41 can be injected into a wide range. By installing the plurality of injection ports 56*m* shorter than the injection port 52*m* of the fifth exemplary embodiment, rigidity of the frame 56 can be increased. Note that, the plurality of injection ports 56*m* need not be provided at all of the outer walls 56*j*. There may be the outer wall 56*j* at which one injection port 56*m* is installed.

Seventh Exemplary Embodiment

An electronic apparatus using any one of the electro-optical device 1, the electro-optical device 31, the electro-optical device 36, the electro-optical device 44, the electro-optical device 51, and the electro-optical device 55 according to the above-described exemplary embodiments will be described.

Figure 12:
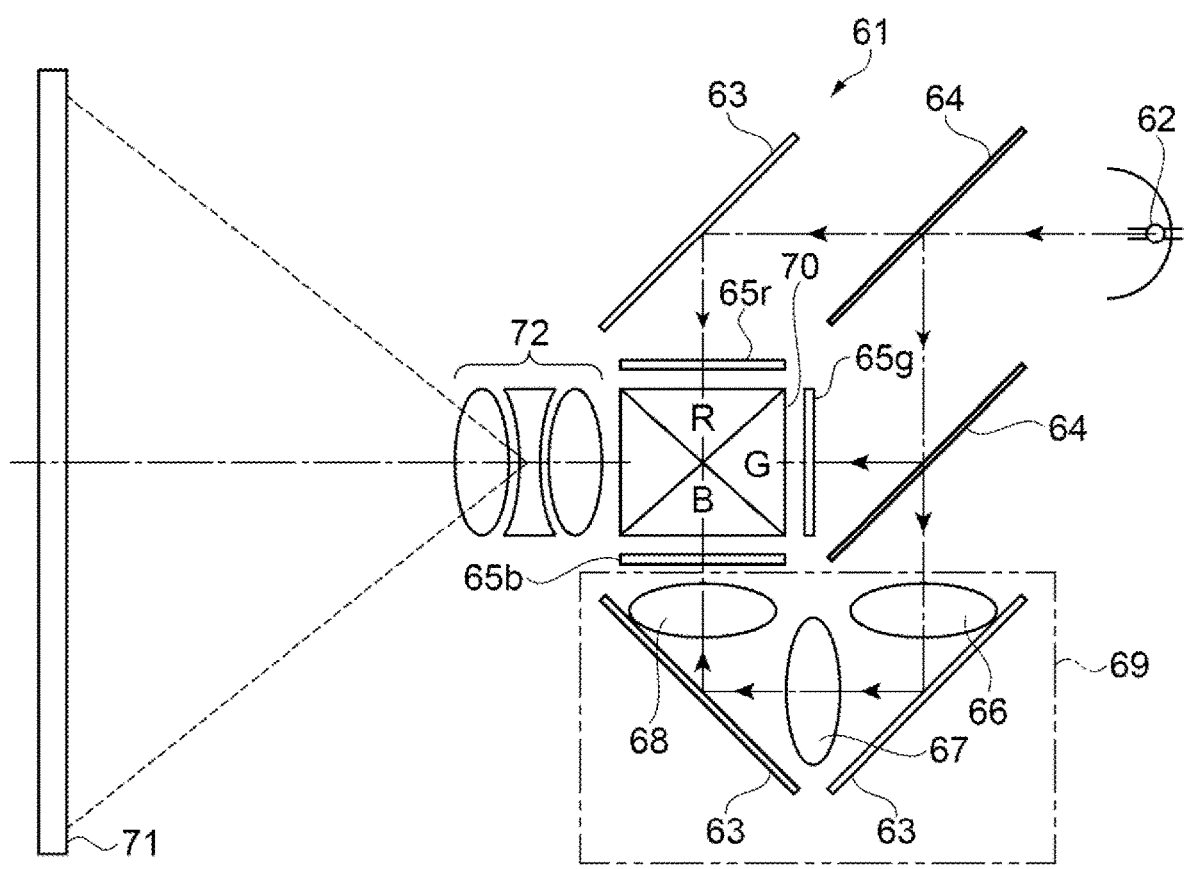
FIG. 12 is a schematic configuration view of a projection-type display device using an electro-optical device according to a seventh exemplary embodiment.

A projection-type display device 61 as an electronic apparatus illustrated in FIG. 12 is an example of the electronic apparatus using any one of the electro-optical device 1, the electro-optical device 31, the electro-optical device 36, the electro-optical device 44, the electro-optical device 51, and the electro-optical device 55.

In the projection-type display device 61, any one of the electro-optical device 1, the electro-optical device 31, the electro-optical device 36, the electro-optical device 44, and the electro-optical device 51, and the electro-optical device 55 is used as a light valve, and a high quality display is possible over a long period of time. As illustrated in FIG. 12, a lamp unit 62 including a white light source such as a halogen lamp is provided inside the projection-type display device 61. Projection light emitted from the lamp unit 62 is split into three primary colors of red, green, and blue by three mirrors 63 and two dichroic mirrors 64 disposed inside. In FIG. 12, red is indicated by "R", green is indicated by "G", and blue is indicated by "B". The split projection light is guided to light valves 65*r*, 65*g*, and 65*b* corresponding to the primary colors, respectively. Note that, since the blue light has a long optical path as compared to the other red and green, the blue light is guided via a relay lens system 69 including an incidence lens 66, a relay lens 67, and an emission lens 68 to prevent a loss due to the long optical path of the blue light.

In the projection-type display device 61, structure of each of the light valves 65*r*, 65*g*, and 65*b* is similar to that of any of the electro-optical device 1, the electro-optical device 31, the electro-optical device 36, the electro-optical device 44, and the electro-optical device 51, and the electro-optical device 55. The light valves 65*r*, 65*g*, and 65*b* are each connected to an upper circuit in the projection-type display device 61 via the flexible printed wiring board 4. An image signal that specifies a gray scale level of a primary color component of each of red, green, blue is supplied from an external upper circuit to each of the light valves 65*r*, 65G, 65*b*. Each of the light valves 65*r*, 65*g*, and 65*b* is driven by an image signal processed by the upper circuit in the projection-type display device 61. Light modulated by each of the light valves 65*r*, 65*g*, and 65*b* is incident on a dichroic prism 70 from three directions. Then, at the dichroic prism 70, the red light and the blue light are reflected at 90 degrees, and the green light is transmitted. Images of the respective primary colors are synthesized by the dichroic prism 70, and subsequently a color image is projected on a screen 71 by a projection optical system configured by a projection lens group 72.

Note that, a projection-type display device may be configured to use, as a light source unit, an LED (light emitting diode) light source configured to emit light in various colors, and the like to supply colored light emitted from the LED light source to another liquid crystal apparatus. Note that, a display element such as a DMD (Digital Micromirror Device) may be employed for a pixel.

The projection-type display device 61 includes any one of the electro-optical device 1, the electro-optical device 31, the electro-optical device 36, the electro-optical device 44, the electro-optical device 51, and the electro-optical device 55. According to this configuration, the projection-type display device 61 includes the electro-optical device capable of reducing a possibility of a deterioration in display quality of the liquid crystal panel unit 3. Accordingly, the projection-type display device 61 can be a device including an electro-optical device that can reduce a possibility of a deterioration in display quality.

Eighth Exemplary Embodiment

An electronic apparatus including any one of the electro-optical device 1, the electro-optical device 31, the electro-optical device 36, the electro-optical device 44, the electro-optical device 51, and the electro-optical device 55 is not limited to the projection-type display device 61 according to the seventh exemplary embodiment. For example, the electro-optical device 1, the electro-optical device 31, the electro-optical device 36, the electro-optical device 44, the electro-optical device 51, or the electro-optical device 55 may be used in an electronic apparatus such as a head up display, a head mounted display, a personal computer, a digital still camera, a liquid crystal television, or the like.

What is claimed is:

1. An electro-optical device, comprising:
   a first substrate;
   a second substrate bonded to the first substrate;
   a liquid crystal layer provided between the first substrate and the second substrate;
   a third substrate provided on an opposite side of the first substrate from the liquid crystal layer; and
   a frame configured to house the first substrate, the second substrate, and the third substrate, wherein
   the frame includes a facing surface facing a first surface of the third substrate, the first surface being located on a side of the third substrate that is opposite to the liquid crystal layer,
   the third substrate is larger than the first substrate, and
   among the first substrate, the second substrate and the third substrate, the frame is only bonded to the third substrate via an adhesive layer, wherein the adhesive layer is disposed between the first surface of the third substrate and the facing surface of the frame and between a side surface of the third substrate and an inner side wall of the frame.

2. An electro-optical device, comprising:
   a first substrate;
   a second substrate bonded to the first substrate;
   a liquid crystal layer provided between the first substrate and the second substrate;
   a third substrate provided on an opposite side of the first substrate from the liquid crystal layer; and
   a frame configured to house the first substrate, the second substrate, and the third substrate, wherein
   the frame includes an abutment surface directly contacting and abutting on a second surface of the third substrate that faces toward the liquid crystal layer, the third substrate is larger than the first substrate, and
the third substrate and the frame are bonded to each other via an adhesive layer disposed between a side surface of the third substrate and an inner wall of the frame.

3. An electro-optical device, comprising:
a first substrate;
a second substrate bonded to the first substrate;
a liquid crystal layer provided between the first substrate and the second substrate;
a third substrate provided at a third surface of the first substrate, the third surface being located on a side of the first substrate that is opposite to the liquid crystal layer; and
a frame configured to house the first substrate, the second substrate and the third substrate, wherein
the frame includes an abutment surface directly contacting and abutting on the third surface,
the abutment surface is located between a side surface of the third substrate and a side surface of the first substrate,
the third substrate is smaller than the first substrate, and
side surfaces of the first substrate and the second substrate and an inner wall of the frame are bonded to each other via an adhesive, and a side surface of the third substrate and the first substrate are not joined by the adhesive.

4. The electro-optical device according to claim 3, wherein
the frame includes a protruding portion that protrudes from the inner wall of the frame toward the third substrate, and
the protruding portion includes the abutment surface.

5. The electro-optical device according to claim 4, wherein
the protruding portion includes a recessed portion between the abutment surface and the inner wall of the frame.

6. The electro-optical device according to claim 3, wherein
the frame includes an injection port through which the adhesive is injected, and
the injection port is provided closer to the second substrate than the abutment surface.

7. An electronic apparatus, comprising:
the electro-optical device according to claim 1.

* * * * *